106-84 CROSS REFERENCE EXAMINER

Patented Jan. 2, 1951 2,536,871

UNITED STATES PATENT OFFICE 2,536,871

COATED ABRASIVE ARTICLES

Richard Paul Carlton, St. Paul, Minn., assignor to Minnesota Mining & Manufacturing Company, St. Paul, Minn., a corporation of Delaware No Drawing. Application March 2, 1942, Serial No. 433,028

1 Claim. (Cl. 51—298)

The present invention relates to abrasive articles and more particularly to abrasive articles employing a silicate cement as a bond.

The present application is a continuation-in-part of my copending application Serial Number 261,069, now abandoned, filed March 10, 1939 for "Siliceous Cement Composition".

Alkali silicate cements have been found to be useful in bonding granular particles into unitary articles such as flexible sheet materials or molded articles. However, in order to be of preferred type it is necessary that the character, ingredients and properties of the siliceous composition or cement be controlled as hereinafter described.

One important use for which silicate cements of suitable character have been found to be advantageous is in bonding abrasive grits or particles, whether of the molded or of the flexible sheet type.

It is an object of this invention to provide a siliceous cement composition of novel characteristics which is especially useful in the bonding of granular material or abrasive particles, for example. A further object is to provide a siliceous cement which has a suitable working life and yet, when set or in final dried form, will have desired properties including waterproofness, strength or resilience, substantial freedom from shrinkage, resistance to heat, density and/or freedom from tendency to crumble, making the same particularly adaptable for the bonding of abrasive particles to each other or to a suitable backing. Another object is to produce an abrasive article by use of a bonding material or siliceous cement which can be applied at ordinary atmospheric or room temperatures and which will set to form a good bond for abrasive particles or grits. A further and salient object is to produce an abrasive article which may be described as self-sharpening. These and other objects and advantages will appear from this application taken as a whole.

The siliceous cement of this invention, in one aspect, may be viewed as being made from three primary ingredients: (1) an alkali silicate, (2) a reactant therefor which will produce a water-insoluble silicate, and (3) an inert material in the nature of a binder or filler. Other types of ingredients may also be employed, where desired, and a single substance may serve both in the capacity of a reactant for the silicate and as a filler or binder. Of course, water is employed in mixing the above types of ingredients to provide a cement of desired consistency.

The alkali silicate usually employed is a sodium silicate solution. Illustrative of suitable reactants for the silicate are compounds of calcium, magnesium, zinc, etc., for example calcium fluophosphate which has a relatively low metallic ion concentration in aqueous solution and will react with the alkali silicate to form a water-resistant product comprising calcium silicate, the reaction being sufficiently slow so as to provide a reasonable long working life for the cement so as to permit working, shaping or spreading the same.

The inert material may be composed of ground quartz, for example. However, various equivalents or substitutes for ground quartz will appear from the description given hereinbelow.

To better illustrate my invention, a number of examples of the elemental components of cements will be given, which may be used, for example, to bond abrasive particles to fibrous backings or for other purposes. Anyone of these examples may be varied or modified, as hereinafter described, depending upon the particular properties desired and all such modifications are contemplated as fully as though set out herein as separately numbered examples.

Example 1

| | Parts |
|---|---|
| Sodium silicate solution | 17 |
| Quartz fines | 14 |
| Apatite | 1 |
| Zinc oxide | 2 |

The sodium silicate had a soda to silicate ratio of 1:2. The solution contained 40 per cent sodium silicate and 60 per cent water.

In the above Example, the apatite, which is calcium fluophosphate, $Ca_5F(PO_4)_3$, and the zinc oxide act as reactants for the sodium silicate to produce insoluble calcium and zinc silicates. The quartz fines serve as the inert filler or binder.

Example 2

| | Parts |
|---|---|
| Sodium silicate solution | 22.2 |
| Quartz fines | 6.0 |
| Clay | 6.0 |
| Zinc oxide | 3.4 |
| Water | 1.5 |

In the above example the sodium silicate solution was of the same character as is described in connection with Example 1. The quartz fines and clay serve as inert material, e. g. as a filler or binder, and the zinc oxide serves as a reactant to insolubilize the sodium silicate. A suitable clay is one of the type of china clay, pottery clay, etc.

*Example 3*

|  | Parts |
|---|---|
| Sodium silicate solution | 14.4 |
| Clay | 3.9 |
| Quartz fines | 3.9 |
| Zinc oxide | 2.2 |
| Water | 1.0 |

The reactants here are similar to those of Example 2 but are present in slightly different proportions.

*Example 4*

|  | Parts |
|---|---|
| Sodium silicate solution | 7.0 |
| Clay | 1.75 |
| Quartz fines | 1.75 |
| Apatite | 0.5 |
| Zinc oxide | 1.0 |
| Water | 0.5 |

As will be evident in view of the discussion hereinabove, the clay and quartz serve as the inert material and the apatite, $Ca_5F(PO_4)_3$, and zinc oxide serve as the insolubilizing reactant material for the sodium silicate.

*Example 5*

|  | Parts |
|---|---|
| Sodium silicate solution | 15 |
| Clay | 12.5 |
| Apatite | 1.0 |
| Zinc oxide | 1.5 |
| Water | 0.5 |

Here the apatite and zinc oxide serve as the reactant for the silicate to form insoluble calcium and zinc silicates. The clay serves a relatively inert material, e. g. as a binder or filler, to improve the characteristics of the siliceous cement.

The ingredients of any one of the above examples, with or without the addition of one or more additional modifying agents, may be mixed together in any suitable manner. For example, the sodium silicate solution may be placed in a mechanical mixer and then the solids, separately or in admixture with each other, may be introduced, preferably gradually, while continuing agitation or stirring until a smooth, uniform cement is produced.

In addition to or in place of quartz or silica fines and/or clay, hereinabove mentioned, other inert mineral fines, and even certain relatively inert metal fines or organic binders or fillers such as wood flour, various resin fines, and the like, may be used. Specific examples of other materials which may be used in addition to or in lieu of silica or quartz fines and/or clay include: feldspar fines, trap rock fines, asbestos fiber, tripoli fines, burnt umber, silicon carbide fines, alundum fines, garnet fines, etc. To add coloring to the siliceous cement, or to abrasive articles (such as so-called sandpaper) made therewith, other materials such as barium chromate, chromium oxide, iron oxide, etc., may be used.

To further characterize inert materials which may be used in making my siliceous cement or bonding material, it should ordinarily be a pulverulent or finely divided material and should occur in the set or hardened cement in a substantially unreacted state. At least a sufficient proportion thereof should be unreacted in order that, in the case of flexible or other abrasive articles, for example, it will serve some or all the following functions, especially the first two mentioned: (1) To prevent substantial shrinkage of the silicate bond; (2) to serve as a strengthening and reinforcing agent for the siliceous cement or bonding materials; (3) to control the viscosity, plasticity or spreadability of the cement by increasing or decreasing proportions of inert material and also by fineness of the inert material; (4) to control appearance of the cement or siliceous material, as where a colored inert material is used; (5) to provide a cement which, in its set condition, is dense and thus ages better in that it restricts absorption of $CO_2$ which, in the case of spongy bonds, has a tendency to reduce the tensile strength of the bond and to cause the bond to become somewhat "crumbly"; and/or (6) to render the use of the cement more economical by reducing the cost thereof per unit weight.

Hereinabove apatite, $Ca_5F(PO_4)_3$, and zinc oxide have been mentioned as illustrative reactant materials for the sodium or potassium silicate, for example in combination, but even singly if desired. Various other metal compounds or insolubilizing agents may be used in addition thereto or in lieu thereof. What is desired of the reactant material is that it react with the alkali at such rate as to give a reasonable working life to the cement and yet provide a cement which will harden within a reasonable time, depending upon factors involved including particularly the use to which the cement is to be put, and also will form an insoluble or waterproof product with the alkali silicate. Other materials, in addition to those above mentioned, which may be used include calcium in carbonate or fluoride form, magnesium oxide, or other compounds which in saturated solution have a comparable metallic ion concentration, including certain compounds of most any of the metals other than the alkali metals, such as compounds of copper, barium, etc., although, other things being equal or comparable, the less costly reactants are, of course, preferred.

While calcium in the carbonate or fluoride forms may, as above indicated, be used as a reactant for the alkali silicate in my cement, calcium oxide and calcium hydroxide (unless its ionization and solubility are otherwise varied or decreased) are not satisfactory. These materials are too soluble. In 100 parts of cold water they will dissolve to the extent of 0.131 and 0.17 parts, respectively. (At this concentration the dissolved material may be considered to be 100% ionized.) While this solubility of only a fraction of one part of CaO or CaOH per 100 parts of cold water may seem quite low, it is still a higher solubility than I desire for reactant material employed. The following will indicate the solubility of some suitable reactant material:

|  | Parts |
|---|---|
| Calcium carbonate, solubility in 100 parts cold water | .0065 |
| Calcium fluoride, solubility in 100 parts cold water | .0037 |
| Magnesium oxide, solubility 100 parts cold water | .00062 |
| Zinc oxide, solubility in 100 parts cold water | .001 |

On the assumption of complete ionization, other metal compounds having comparable solubility and which will form insoluble or substantially insoluble silicates may be used as insolubilizing agents for the alkali silicate. However, where ionization of dissolved reactant material is reduced substantially, as to one-half, one-quarter or less of its normal ionization in cold water, by the use of additional agents or modifiers, for example by the use of materials, such as ammonia, which form complex ions with certain metals, reactants having correspondingly higher solubility than indicated above may be used.

While the usual and preferred embodiment of my invention contemplates the use of one type of material as a reactant for the alkali silicate and an entirely different material as the inert or binder material, it is readily possible, by proper choice of reactant modifier, such as calcium carbonate, apatite, etc. and by using a sufficient excess thereof, to make the one material serve both functions, i. e. serve as a reactant or insolubilizing agent while the excess thereof serves as a binder or filler or material which obviates or greatly minimizes any tendency of the siliceous cement to shrink or lose its tensile strength.

In addition to the ingredients given, by way of illustration, in each or any of the examples set out hereinabove, organic agents or modifiers of high molecular weight, including water insoluble organic adhesives that are usually solid at room temperatures and proteins that do not melt upon heating, may be used and are contemplated. For example, dextrose, casein, water insoluble and water soluble salts of casein, blood albumen, rubber latex, glucose, gum arabic, dextrin, glycerine, etc., may be employed to improve the flexibility, density and/or tensile strength, for example, of siliceous bonds or cements employed for any desired purpose such as in the bonding of abrasive grits to a cellulosic or fibrous backing. When flexibility is not of particular importance, phenol-formaldehyde resins in a "set-up" state, may be employed as modifiers. Where rubber latex is used it may be employed in emulsion form, either using the rubber latex in relatively small amount such as about 2 or 3 per cent of rubber latex, based on the sodium silicate solution, or in relatively large amounts, depending upon properties desired in abrasive article or the bond therefor. Casein can be used in widely varying ratios, but, where dextrose is used, it will ordinarily be employed in relatively small amounts, such as about 2%, based on the sodium silicate solution, unless its tendency to decrease the water resistance of the silicate cement or coating is counteracted by a separate material or agent, which however is not a part of this invention.

While casein and the like have been indicated as addition agents or modifiers for the silicate cement, the former may be the preponderant ingredient and the silicate may serve as a modifier therefor. For example, by using casein or the like as the main ingredient of the abrasive grid-bonding coat and an alkali silicate as a modifier therefor, an excellent heat-proof bonding material of comparatively high tensile strength and toughness is obtained.

Mixtures of sodium silicate and casein may for example, be employed in which the solvent for the casein also serves as a waterproofing agent for the sodium silicate. An example of this is as follows: soak 100 grams of casein in 250 grams of water. Then in a separate vessel mix 20 or 30 grams of Ca (OH)$_2$ in 100 grams of water. Then stir the two mixtures together. When the casein is dissolved, then add 70 grams of sodium silicate solution (for example) of 1.38 Spec. Grav. and a ratio of Na$_2$O to SiO$_2$ of 1:3).

Sodium silicate and casein, mixed together for use in making sheet or like abrasive articles, may both be insolubilized or waterproofed by the same agent. An example is as follows: Dissolve 35 kilograms of casein in 100 kilograms of water and then stir in 2 kilograms of NaOH which has been disolved in 50 kilograms of water. To that, add 25 kilograms of sodium silicate solution (1.38 Spec. Grav. with a ratio of NaO to SiO$_2$ of 1:32). This mix can be insolubilized by an ammonical solution of copper sulphate, of zinc sulphate or chloride, of chromium chloride or nitrate or with an ammonical solution of other soluble salts of copper, zinc, tin, chromium or manganese, for example, or with solutions of magnesium silico fluoride or zinc silico fluoride, or with barium sulphate in powdered form or with a mixture of barium sulphate and calcium carbonate.

Where casein is used in the silicate mix, as where casein preponderates over the alkali silicate, it will be seen from the above that insolubilizing agents such as slaked lime, Ca (OH)$_2$, can be used which may not be used where sodium silicate in the absence of casein or the like, is used.

It will also be understood that other materials, such as organic adhesives, especially other treated proteins, which preferably are of the class that do not melt upon heating may be substituted in place of some of the casein or, with certain of them, they may replace all of the casein. Contemplated substitutes of this type include wheat gluten, soya bean meal (glycinin) and ivory nut flour, and less heat-resistant modifiers as blood albumen, dextrine, zein, etc. Glue may be substituted in place of part of the casin, small amounts of glue serving to increase the life of the abrasive articles, i. e. of the bond or grit-sizing coat thereof, as the case may be.

It will be observed that sodium silicate is itself a solvent for casein. Other solvents for casein include sodium acetate, sodium oxalate, trisodium phosphate, disodium phosphate, sodium arsenate, calcium hydroxide, ammonium hydroxide, organic bases such as tetraethyl amine, etc.

Waterproofing agents for casein, in addition to those above mentioned, include chromium peroxide, furfurol, chromium potassium sulphate, etc.

In making abrasive articles (e. g. flexible sheet abrasive goods) with siliceous cements, standard methods may be employed. For example, a layer of siliceous cement in a suitable state of plasticity or viscosity may be coated on a cellulosic, paper, cloth or other suitable backing, the coating being applied by the use of doctor blades, rolls, or other means well known in the art. Then granules or grit particles may be applied to the cement coated backing, so that they become embedded in the cement, by sprinking the same thereon, by electrostatic deposition or by any other suitable means known to the art.

The cement, with grits embedded therein, is ordinarily air dried, at least until water present as such is substantially completely eliminated. Then, if desired, the abrasive article may be heated to a superatmospheric temperature in order further to complete the desired reactions and to secure better waterproofness and ageing qualities. This heating is normally desired in commercial operations but is not always used. The superatmospheric temperatures employed may be of the order of 120° C., which is a preferred temperature, through higher or lower temperatures may be employed. In employing higher temperatures, care must be taken not to injure the cellulosic backing and, while temperatures as high as about 160° C. may be used with most backings and temperatures of 200° C. or higher may be safely used with a number of backing materials, especially pretreated backings, a safe and satisfactory operation is had by not going above about 150° C. or, more preferably, using temperature of the order of 120° C., slightly more or slightly less, for this purpose.

Following the application of a siliceous grit-bonding coat, a sandsizing or grit-sizing coat may be applied. This may be a siliceous material of the nature of that used as a grit-bonding coat, though a siliceous mix, where used, is usually employed in a more fluid state, or it may comprise a vinyl resin, an oil-varnish resin, a rubbery resin, a phenol-aldehyde resin or other heat-hardenable resins. Materials of the latter type have the virtue of both serving the usual function of a sandsizing coat and also the function of a preservative for the silicate bond, for example by shielding the silicate bond from the carbon dioxide or other gases. The sandsizing ingredients may be applied by use of solvents and/or heat or other means.

Others have experienced difficulties in using various reactants such as some of those herein illustrated, e. g. zinc oxide, in making siliceous cements used to bond abrasive particles, but it appears that such difficulties arose from improper use of such reactants rather than from the reactants themselves. For example, others have apparently encountered blistering or cracking of the silicate bond, but such difficulties are avoided by using and curing such cements as hereinabove set out.

In general a more viscous cement or adhesive will be used or desired where large sized grits or abrasive particles are employed than where smaller grits are employed.

In addition to using the siliceous adhesive or cement, as herein described and of character as above exemplified or preferably modified as herein otherwise described, as a grit-bonding coat, it may also be used as a sandsizing or grit-sizing coat, which may be applied over surfaces of the grits or layer or abrasive particles after the siliceous bonding material or grit-bonding coat has set completely or to substantial extent. However, the sandsizing coat as employed is usually more fluid than the siliceous grit-bonding coat and should employ inert material of small particle size, e. g. such as to pass, for example an 80 mesh screen, a 200 mesh screen, or the grit may be of still smaller size, depending upon the size of granular material or abrasive particles, as the case may be, among other things, the inert material being desirably substantially smaller than the abrasive grit.

The particle size of the inert material or filler in the siliceous bonding material or cement is limited in the making of sheet abrasive articles by the size of the grit and also should be controlled in accordance with the viscosity of the cement. If an abrasive is used which will just pass a 24 mesh screen, the inert material or filler may, for example, be of such size as to pass an 80 mesh screen, or the inert material may be of still smaller size. The preferred procedure is actually to employ a gradation of sizes of inert material which, in this particular case might, for example, be a mixture of 80 mesh, 150 mesh and 240 mesh inert material. If the abrasive grit used is of such size that it will just pass an 80 mesh screen, then the inert material should, for example, pass a 200 mesh screen or a 240 mesh screen, or be still smaller, or may preferably include a gradation of grit sizes chosen from any of the following: 200 mesh down through 240, 280, 320, 360 and 400 mesh to and including an impalpable powder. For a given proportion of inert material or filler, the finer the inert material, the higher the viscosity or the less the pliability of the resulting cement. However, the viscosity of the siliceous cement is influenced by other factors, including the relative proportions of inert material to other ingredients, the character and proportions of reactant material and the character and strength of the alkali silicate solution. The grain size of the filler is, accordingly, preferably so regulated that, on standing, the cement will remain uniform and the filler will not settle out. To accomplish this result, the less viscous the cement, the finer the filler I employ in order to insure that it will remain uniformly in suspension.

While a suitable composition of alkali silicates has been illustrated hereinabove, where sodium silicate is employed the soda to silica molecular ratio is preferably within the range of 1:1.5 to 1:3.5, or of that order, and ordinarily will come within the range of 1:2 to about 1:3.3.

While hereinabove I have described my cement, in the making of abrasive articles, for use as a grit-bonding coat and/or for use as a grit-sizing coat, it may also be used as a presize or backsize coat and any desired number of layers or coatings may be employed, with or without curing between the application of the several layers. Where, for example, a vulcanized fibrous backing is used, it is ordinarily given a priming coat of a dilute siliceous cement or other material, e. g. sodium hydroxide, vinyl polymers or copolymers such as polyvinyl alcohol, etc., to improve the bonding of the making coat or grit-bonding coat to the backing.

In the use of my cements in making flexible sheet abrasive articles, for example, it is desirable to control the ingredients so that the cement will have a working life of at least about four hours. As above indicated, the working life of the cement may be controlled by various methods, e. g. by selecting a reactant for the alkali silicate of sufficiently low solubility or metallic ion concentration so that the double decomposition reaction with the sodium silicate will not proceed too rapidly.

Where the abrasive article is not to be used for a long time, it is often advantageous to shield the silicate bond from $CO_2$ or other gases of the atmosphere by coating the same with a very thin coating of wax, rubber, etc., which may, for example, be deposited thereon from a suitable vehicle.

A very important advantage of abrasive articles made with siliceous cements of the particular type herein illustrated is that such abrasive articles, for example in sheet form, have the normal advantage over glued-bond sheet abrasives that the bond will not soften under the heat generated during use and further have the unusual and surprising advantage over many resin bond sheet abrasives, and also over abrasive articles having certain types of siliceous bonds, in that, when particular abrasive particles become dull and, for that reason, become heated to a higher temperature than other grains or particles, the excess heat developed by such dull particles seems to cause the silicate cement to powder around the socket holding each of such dull granules or particles and the respective dull granules, as a consequence, fall out, thus causing the abrasive article as a whole to remain sharp and capable of cutting well. This reasoning is largely hypothetical but, whatever the correct theory, sheet abrasive articles made with silicate cements such as I have illustrated remain sharp for long periods of time, whereas abrasive articles made with certain different siliceous cements, with which I am familiar in a general way, do not have this characteristic and become dull relatively soon. This property of my siliceous cements is especially useful in "sanding" on flat operations and/or where an unusual amount of heat is developed, my siliceous cements being used in making abrasive articles of any suitable form or shape.

While I have herein described my invention in various details by use of examples and have illustrated specific uses thereof, it will be understood that this is by way af exemplification and not by way of limitation. All embodiments within the scope of the appended claims are contemplated.

What I claim is:

A flexible abrasive article comprising a flexible backing material and abrasive grains adhesively secured thereto by means of a base adhesive comprising a mixture of a soluble silicate and a resin, said adhesive layer being protected from the atmosphere by a resin size coating.

RICHARD PAUL CARLTON.

REFERENCES CITED

The following references are of record in the file of this patent:

UNITED STATES PATENTS

| Number | Name | Date |
|---|---|---|
| 125,390 | Henshaw | Apr. 9, 1872 |
| 224,078 | Copeland | Feb. 3, 1880 |
| 225,658 | Stevens | Mar. 16, 1880 |
| 230,202 | Sibley | July 20, 1880 |
| 1,030,114 | Neil | June 18, 1912 |
| 1,373,412 | Craver | Apr. 4, 1921 |
| 1,468,960 | Crupi | Sept. 25, 1923 |
| 1,555,119 | Johanson et al. | Sept. 29, 1925 |
| 1,615,271 | Hartmann | Jan. 25, 1927 |
| 1,775,631 | Carlton | Sept. 16, 1930 |
| 1,777,162 | Biddle | Sept. 30, 1930 |
| 1,814,768 | Rippey et al. | July 14, 1931 |
| 2,089,426 | Richmond | Aug. 10, 1937 |
| 2,101,050 | Hosking | Dec. 7, 1937 |
| 2,114,166 | de Leeuw | Apr. 12, 1938 |